United States Patent [19]

Guipaud

[11] 4,164,204

[45] Aug. 14, 1979

[54] SIMPLIFIED METHOD AND APPARATUS FOR ASSURING PERIODIC CONTROL OF THE TIMING OF AN INTERNAL COMBUSTION ENGINE

[75] Inventor: Serge Guipaud, Castelnaudary, France

[73] Assignee: Societe Anonyme pour L'Equipement Electrique des Vehicules S.E.V. MARCHAL, Issy les Moulineaux, France

[21] Appl. No.: 714,138

[22] Filed: Aug. 13, 1976

[30] Foreign Application Priority Data

Aug. 18, 1975 [FR] France .................................. 75 25468

[51] Int. Cl.$^2$ ............................ F02P 5/08; F02P 3/02
[52] U.S. Cl. ................................ 123/117 R; 123/148 E
[58] Field of Search ........... 123/117 R, 117 D, 148 E; 315/209 T, 209 M

[56] References Cited

U.S. PATENT DOCUMENTS

| 3,587,552 | 6/1971 | Varaut | 123/148 E |
| 3,811,420 | 5/1974 | Vogel | 123/117 R |
| 3,867,916 | 2/1975 | Bigalke | 123/117 R |
| 3,952,715 | 4/1976 | Van Siclen, Jr. | 123/117 R |

FOREIGN PATENT DOCUMENTS 2513056 10/1975 Fed. Rep. of Germany ...... 123/117 D

OTHER PUBLICATIONS

"Een Voorstel om het ontstekingstijdstip van automotoven electronisch te regelen" by Hoetink, B. J. de Ingenieur, vol. 76, No. 22, pp. W95–W99.

*Primary Examiner*—Charles J. Myhre
*Assistant Examiner*—P. S. Lall
*Attorney, Agent, or Firm*—Brisebois & Kruger

[57] ABSTRACT

Method and apparatus for periodically controlling the timing of an internal combustion engine in which two voltages are generated, one of which corresponds to a selected portion of one complete rotation of the engine shaft whereas the other is a function of time. A control signal is generated when the second voltage becomes equal to the first. The first voltage is of the form $aq+b+ce^{-\gamma q}$, in which a, b, and c may be any constants and $\gamma$ is a positive constant, while the second voltage is of the form $d+ge^{-\alpha t}$, in which d and g may be any constants and $\alpha$ is a positive constant.

14 Claims, 3 Drawing Figures

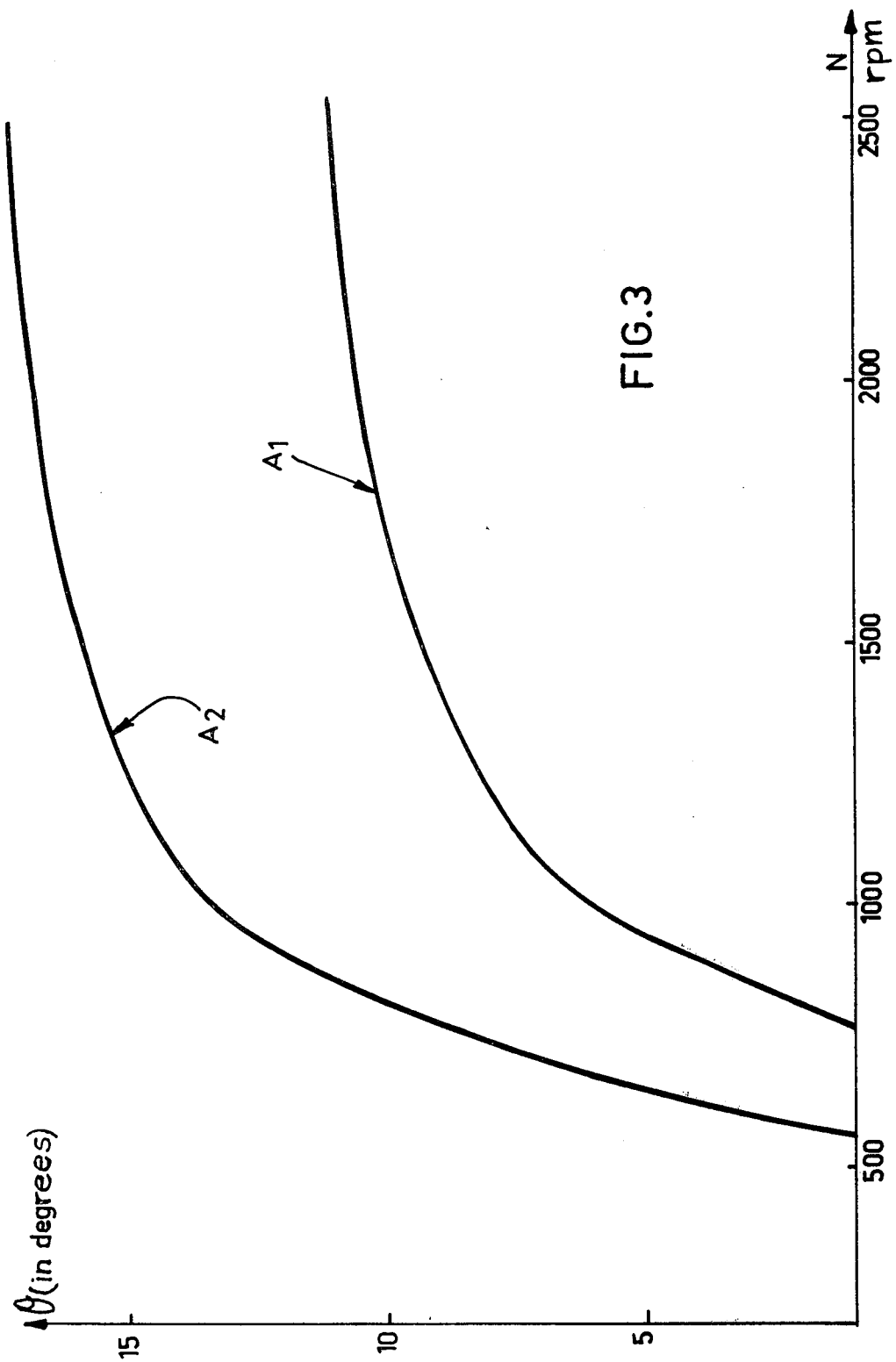

SIMPLIFIED METHOD AND APPARATUS FOR ASSURING PERIODIC CONTROL OF THE TIMING OF AN INTERNAL COMBUSTION ENGINE

SUMMARY OF THE INVENTION

It is known to be necessary in order to insure the satisfactory operation of a reciprocating internal combustion motor, such as the motor of an automotive vehicle, for example, to ignite the combustible gas in advance of the moment at which the piston reaches the top dead center point in the cylinder in question. In devices of a conventional type, the ignition is advanced by means of a centrifugal advance device and by means of a vacuum operated advance device, these two devices constituting mechanical controls which determine the relative position of a cam and a switch, the cam being driven in rotation by the motor and the switch being inserted in the primary circuit of an ignition coil. In this type of apparatus the presence of several mechanical parts is a by no means negligible cause of engine trouble and, moreover, rapid opening and closing of the switches leads to a progressive deterioration of their contacts during use, so that good operation requires frequent maintenance.

In order to avoid the disadvantages resulting from the use of a switch it has already been proposed, for example in applicant's U.S. Pat. Application Ser. No. 562,844, filed Mar. 27, 1975, U.S. Pat. No. 4,066,968, to provide analogous devices making it possible to control the timing of an internal combustion engine by utilizing only electronic components, thus eliminating the mechanical devices customarily required. These electronic component devices make it possible to initiate the ignition with an advance the representative curve of which is a straight line, as a function of the speed of rotation. When the advance curve takes the form of a succession of connected straight line segments, it is necessary either to provide a relatively complex speed discriminating circuit to select those of the electronic circuits which should be used in the speed zone in which one is operating, or utilize a group of circuits functioning simultaneously, one of which is selected by comparison on the assumption that the advancement curve is a monotone or straight line in the working interval. These prior art electronic devices work on the principle of comparing two voltages, the first of which is a linear function of the inverse of the speed of rotation of the motor with which the device is associated, and the second is a linear function of time. This comparison makes it possible to generate a control signal which results in producing, for the ignition of the internal combustion motor of an automotive vehicle, a linear curve of ignition advancement as a function of the speed of rotation. This linearity, as has been explained above, makes it necessary, in order to obtain a curve consisting of several different straight segments, to add a certain number of electronic components to the circuits generating the first and second voltages, so as to permit a change in straight segments when shifting from one range of speeds of rotation to another range of speeds of rotation.

It is the object of the present invention to provide an analog electronic device which makes it possible to obtain an ignition advance curve as a function of the speed of rotation which has a finite radius of curvature which differs in dependence on the points of the curve.

In this way it is possible, over the entire range of rotational speeds which must be taken into consideration, to obtain a single curve by comparing two voltages, one of which is a function of the inverse of the speed of rotation and the other of which is a function of time. It is thus no longer necessary to have available supplementary electronic components for changing the straight curve segment in dependence on the portion of the total operating range within which one is working, as is the case in the devices of the prior art. This results not only in a simplification of the electronic device and consequently a decrease in its cost, but also in an improved response to the needs of the motors.

The device according to the invention receives information from a certain number of sensors, and in particular from a speed detector, which indicates the speed of rotation of a shaft which, in the case of a control for the ignition of an internal combustion motor, may be a shaft connected to the crankshaft or cam shaft of the motor. The device according to the invention is an analog assembly which transforms the information received into control signals which are supplied either to the ignition coil or to other means controlled by the device from, for example, a fuel pump, a starter, a fuel injection device, a carburetor, an air pump, or an automatic transmission. It will be appreciated that this list of possible applications is representative and not exhaustive.

In accordance with the invention at least one of the two voltages compared is an asymptotic exponential function which may be simply provided by the charging or discharging of a circuit comprising a condenser and a resistance. It has already been proposed in the prior art that, in order to control the ignition of an internal combustion motor, two voltages be compared, one of which is an exponential function of time and the other of which is proportional to the speed of rotation of the shaft of the motor (see the article by B. J. Hoetink, in the Dutch Review, "de Ingenieur", Volume 76, No. 22, pages W95 to W99). However, this prior art device is not satisfactory because the curve which represents the ignition advance as a function of the speed of rotation is an exponential asymptotic curve in which the position of the asymptote is a function of the structure of the sensor for the speed of rotation which is used. It follows that, for a given sensor, the position of the asymptote is determined, which makes it impossible to modify the curve as a function of the values of parameters other than the speed of rotation and, in particular, as a function of the vacuum. On the contrary, the device according to the invention makes it possible to obtain an ignition advance the curve of which, as a function of the speed of rotation, is an exponential asymptotic curve, the position of the asymptote being essentially a function of the characteristics of the electronic circuits used and, in particular, of the value of the resistances and the capacitances which are included in the circuits generating the exponential voltages compared. It follows that one may easily introduce parameters other than the speed of rotation of the motor and, in particular, the value of a vacuum, so as to modify the ignition advance curve obtained, by simply changing the value of a resistance or a capacitor.

It is therefore an object of the present invention to provide a process for insuring the periodic control of at least one function dependent upon one or more parameters, and in particular, on the speed of rotation of a shaft, which control must be initiated with a phase displacement with respect to the instant of passage of an indicator connected to the shaft before a stationary mark, the displacement being a function of the speed of rotation of the shaft. In this process a signal P is generated, the duration q of which corresponds to passage of a rotating sector having a constant angle $\phi$ in front of a stationary mark, the angle $(2\pi - \phi)$ corresponding to the absence of this signal for a time $\bar{q}$. A complementary signal $\bar{P}$ may be generated throughout the period $\bar{q}$. After having generated a signal P, there is generated, during a subsequent period $\bar{q}$ or q, a first voltage which is a function of q. During one of the subsequent periods q, a second voltage is generated as a function of the time t from the beginning of the period q of the signal P under consideration. A control signal is generated when the second of the aforesaid voltages becomes equal to the first, said control signal being used to initiate the control step in question. The process is characterized by the fact that the first voltage is of the form $q+b+ce^{-\gamma q}$; a, b and c being any constants and $\gamma$ being a positive constant, and that the second voltage is of the form $d+ge^{-\alpha t}$, d and g being any constants and $\alpha$ being a positive constant.

In a preferred embodiment of the process according to the invention the first voltage is generated during the period $\bar{q}$ following a period q of the signal P. This first voltage is stored and the second voltage is generated during the following period q. The second voltage is generated at the terminals of a condenser which is charged through a charging resistance. In a simple and advantageous embodiment, the first voltage is a linear function of q. In this case the first voltage is obtained by utilizing an integrator which operates during the period of the signal P or $\bar{P}$. The return to the initial state of the first and second voltages preferably occurs at the moment at which the trailing edge of the signal P occurs. In the case in which it is desired to utilize parameters other than the speed of rotation of the shaft, for example the value of the vacuum in an intake line, the characteristics of the components of the circuits permitting the generation of the first and/or second voltage are modified as a function of the parameter to be used.

The value of the process according to the invention comes from the fact that the electronic circuits making it possible to generate the first and second voltages which are to be compared are particularly simple since the linear functions may be generated without difficulty by means of an integrator and the asymptotic exponential functions may be generated without difficulty by charging a condenser.

If this process is used for the ignition of an internal combustion motor it is arranged so that the top dead point corresponds to the end of the passage of the sector having an angle of rotation $\phi$ is in front of the stationary mark associated therewith, that is to say, at the end of the signal P. The time $t_o$ at which equality between the first and second voltages occurs is counted, beginning with the beginning of the signal P and the ignition advance is thus equal to the difference between the duration of the signal P and the time $t_o$. If the angular rotation of the shaft is equated to time by designating by N the angular speed of rotation expressed in revolutions per minute, one may write $$t_o = \frac{\phi - \theta}{6N},$$

a formula in which $\theta$ represents the advance of the ignition in degrees, $\phi$ is in degrees, N is in RPM, and the quantity $$6N = \left( \frac{N(rev/min)}{60sec/min} \times 360°/rev \right)$$

so that $t_o$ is in seconds.

It will, moreover, be seen that, if the second voltage never becomes equal to the first, and the ignition is fired at the end of the signal P, there is no advance of the ignition. If an initial setting is desired in which there is an advance or a lag in firing, it suffices to displace the rotating angular sector of the sensor with respect to the fixed mark so that the end of the passage of the rotating sector by the fixed mark is angularly displaced with respect to the top dead point.

Taking into account the form of the equations representing the first and second voltage and allowing, on the other hand, for the relationship, above indicated, which exists between $\theta$ and $t_o$, it may be easily deduced that, when the ignition is fired because the first and second voltages have become equal, the expression of $\theta$ as a function of N is of the form: $\theta = \phi + KN$ Log $(1+(A/N)+Be^{-\beta/N})$. In this formula K, A, B and $\beta$ are constants which are essentially a function of the characteristics of the components of the electronic circuits which generate the first and second voltages. One may therefore, for example, by adjusting the value of a resistance, modify the ignition curve obtained as a function of the value of a parameter such as the vacuum in the intake line of the motor.

A further object of the present invention is to provide the new article of manufcture which consists of a device adapted to carry out the above defined process and particularly adapted to assure the timing of the ignition of a reciprocating internal combustion motor with respect to the top dead point of the stroke of each piston, said device comprising a stationary sensor which cooperates with a rotating sector having the angle $\phi$ and associated with the shaft, the speed of rotation of which determines the command to fire, said sensor supplying, during the passage of the sector having the angle $\phi$ aforesaid, a signal P of duration q, characterized by the fact that it comprises, in the first place, a circuit which generates a first voltage of the form $aq+b+ce^{-\gamma q}$; a, b, and c being any constants and $\gamma$ a positive constant; in the second place, a circuit which generates a second voltage of the form $d+ge^{-\alpha t}$, in which formula d and g are any constants, $\alpha$ is a positive constant and t represents the time counted from the beginning of the signal P; and, in the third place, a comparator supplied by the two above circuits and capable of generating a control signal when the second voltage becomes equal to the first voltage.

When the second voltage does not become equal to the first voltage before the end of the signal P during which it is generated and when it is desired to initiate the control signal at the moment at which the signal P ends, the output of the comparator and the signal $\bar{P}$ is connected to an OR gate permitting the delivery of a control signal.

In a preferred embodiment of the invention the control signal emitted at the moment at which ignition must occur is supplied to the input of a monostable, the output of which controls two transistors associated in a "Darlington" pair, said pair making it possible to cut off the supply to the primary coil of the ignition coil associated with the device at the moment at which emission of the control signal takes place. When the first voltage is a linear function of q, that is to say in the case in which c=o, the circuit generating the first voltage is an integrator functioning for the duration of the signal $\bar{P}$, the output voltage of said integrator being maintained during the following signal P by means of a condenser connected between an input and the output of the integrator. The output voltage of the integrator is returned to zero by supplying a reverse voltage pulse to the integrator input connected to the condenser at the moment at which the trailing edge of the signal P occurs. This pulse is provided by a monostable multivibrator in response to the trailing edge of the signal P. The integrator, which generates the first voltage, has its input other than the one which is connected to the condenser supplied during the signal $\bar{P}$ and connected to ground during the signal P through a transistor. The circuit generating the second voltage consists of a condenser associated with a charging resistance. The charging resistance of the circuit generating the second voltage is continuously or discontinuously modified as a function of the value of a parameter such as the vacuum in the intake line of the motor which is associated with the device.

In order that the invention may be better understood, one embodiment thereof will now be described, purely by way of illustration and example, with reference to the accompanying drawings in which:

FIG. 3 shows the two ignition curves which may be obtained with the device of FIG. 2.

Figure 1:
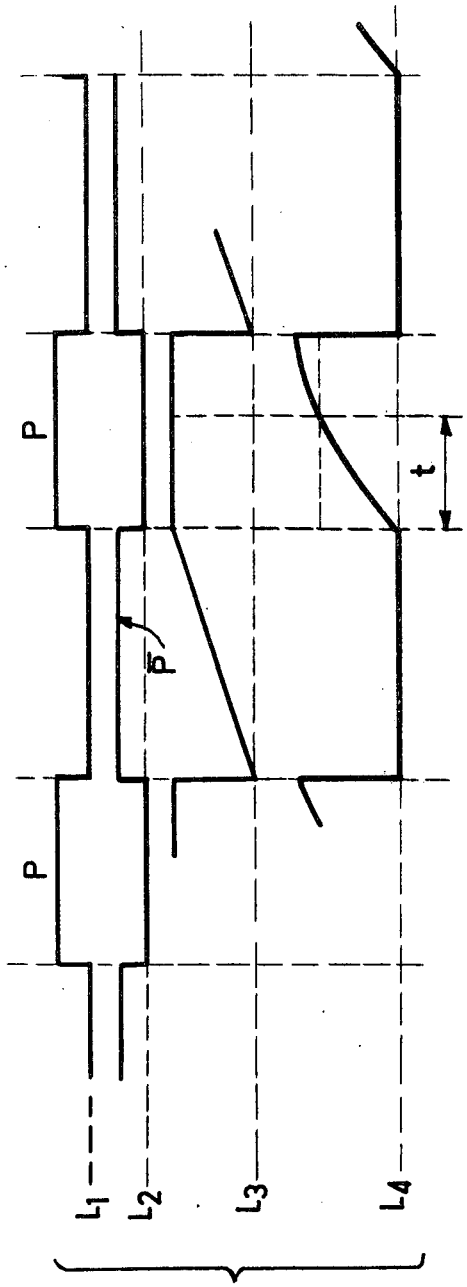
FIG. 1 shows, on the four lines L1, L2, L3, L4, signals P and $\bar{P}$ and the first and second voltages which are compared.

Referring now to the drawings, it will be seen that on the line L1 of FIG. 1 a square wave signal designated by P is illustrated. The signal is obtained by means of a sensor of a conventional type, such as the one illustrated on FIG. 1 Applicant's U.S. Pat. Application Ser. No. 562,844, filed Mar. 27, 1975. This sensor comprises a rotating sector subtending an angle $\phi$ which travels past a stationary cell and is driven in rotation by the crankshaft of the motor with which the ignition device which will be described is associated The rotating sector subtending an angle $\phi$ turns at a speed of rotation N (N being the angular speed expressed in RPM) and the rotating sector subtending the angle $\phi$ is set so that the top dead point of the cylinders of the motor corresponds to the passage of the end of the sector subtending an angle $\phi$ past the stationary cell of the sensor so that the top dead point correspond to the end of a signal P. On the line L2 of FIG. 1 the complementary signal $\bar{P}$ is represented. The duration of signal P is indicated by q and the duration of signal $\bar{P}$ by $\bar{q}$. In the device which will be described for this embodiment a first voltage is generated which is proportional to $\bar{q}$ throughout the duration of the signal $\bar{P}$ and this voltage is stored throughout the duration of signal P. The signal thus obtained is represented on line L3 of FIG. 1.

Since $\bar{q}$ is proportional to 1/N, the value of the first voltage stored during P is of the form $K_1/N$. A second voltage is also generated during the duration of signal P, the expression of which is in the form $V_o(1-e^{-t/RC})$; $V_o$, R and C being constants and t representing the time counted from the beginning of signal P. The signal corresponding to the second voltage has been represented on the line L4 of FIG. 1. The first and second voltages are returned to zero at the end of signal P. The first and second voltages are compared. When the second voltage has become equal to the first voltage stored, one has: $V_o(1-e^{-t/RC})=K_1/N$ and since, as has been previously indicated, one also has $$t = \frac{\phi - \theta}{6N},$$

$\theta$ representing the angle of advance of the ignition, it may be deduced that, at the moment at which the first and second voltages are equal, one has $$\theta = \phi + 6NRC \log(1 - \frac{K_1}{V_oN}).$$

Figure 2:
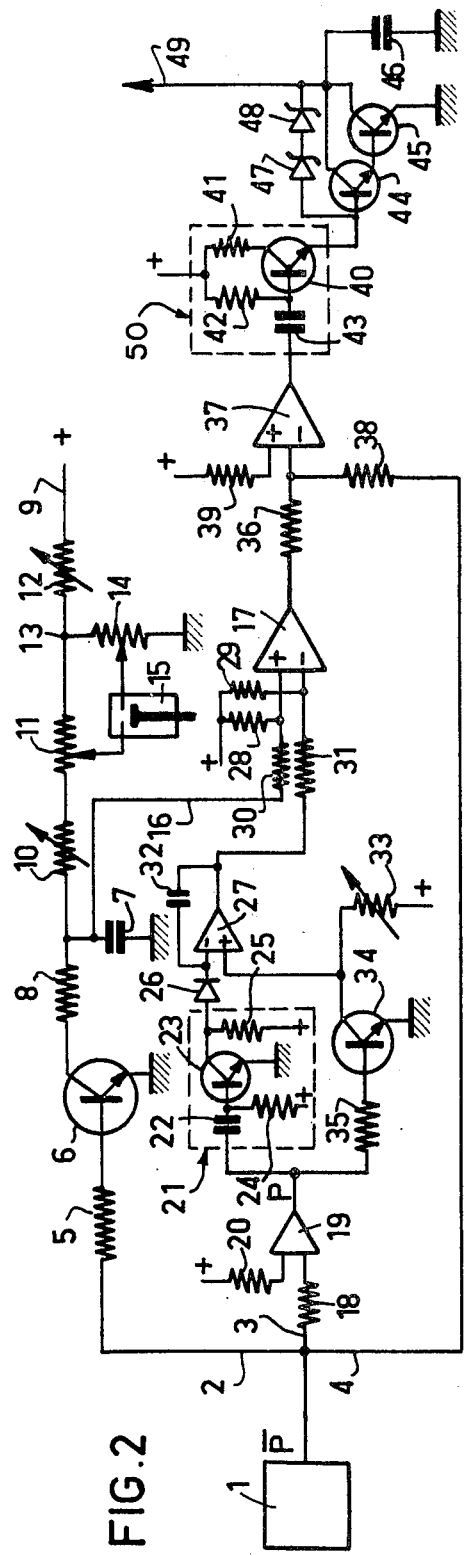
FIG. 2 is an electrical circuit diagram of the device according to the invention.

On FIG. 3 the ignition curves corresponding to the above indicated formula have been illustrated and show the variations of $\theta$ as a function of N. The angle $\phi$ is determined by the sensor which is used and must then be considered as a constant. The curve yielding $\theta$ as a function of N therefore depends on two parameters, to wit $$\frac{K_1}{V_o},$$

on the one hand, and RC on the other hand. It will thus be seen that one may easily, with the process according to the invention, obtain any ignition curve which may be desired by simply selecting in a suitable manner the parameters $$\frac{K_1}{V_o},$$

on the one hand, and Rc on the other hand. FIG. 2 is the diagram of a circuit making it possible to obtain the first and second voltages shown on lines L3 and L4 of FIG. 1 and also making it possible to generate a control signal at the moment at which these two voltages become equal. If the second voltage does not attain the value of the first voltage, the ignition, in this embodiment, fires at the top dead point, that is to say, with a zero ignition advance. This is what the curves of FIG. 3 show.

Referring now to FIG. 2 it will be seen that reference numeral 1 indicates, in its entirety, a sensor capable of generating the signal $\bar{P}$. The details of this sensor are not given because it is a device of a known type. The signal P is delivered over three different lines 2, 3 and 4.

Line 2 supplies through a resistor 5 the base of a transistor 6, the emitter of which is connected to ground and the collector of which is connected to one of the plates of a condenser 7 through a resistance 8. The other plate of condenser 7 is connected to ground. The plate of the condenser 7 which is connected to the resistor 8 is also connected to the positive supply 9 through a group of resistances 10, 11, 12. Resistance 12 is adjustable and its end 13 is connected to ground through a resistor 14. The point 13 has a voltage which is a function of the adjustment of the resistance 12 and may be designated by $V_o$. A switch 15 is adapted to establish a direct connection between a point on resistance 11 and a point on resistance 14 so as to be capable of modifying the value of the charging resistance R which is associated with the condenser 7. When the switch 15 is open this charging resistance consists of the resistances 10 and 11. When the switch 15 is closed the charging resistance consists of a part of the resistance 14, part of the resistance 11 and the resistance 10. The resistance 10 has a variable value and one may thus with this device, adjust the charging resistance R to the desired value. The opening or closing of the switch 15 makes it possible to obtain two distinct values of R. The adjustment of the resistance 12 makes it possible to adjust the value of the voltage $V_o$. The charging voltage of the condenser is drawn off by the line 16 and supplied to the positive input of a comparator 17. The voltage transmitted by the line 16 is said second voltage in the definition of the invention. The condenser 7, the capacitance of which is C, charges during the duration of signal P and the voltage on the line 16 is the one represented on line L4 of FIG. 1 and the mathematical expression for which has already been given. The transistor 6 is blocked (non-conducting) during the duration of signal P and opens (becomes conducting) at the beginning of signal P, which permits the discharge of the condenser 7 and the return to zero of the second voltage.

The line 3 supplies, through a resistance 18, the negative input of an inverter 19 the positive input of which is connected to the positive supply through a resistance 20. The invertor 19 thus supplies a signal P which is transmitted to a monostable multivibrator indicated in its entirety by reference numeral 21. The multi-vibrator 21 consists of a condenser 22 which is connected to the base of a transistor 23, said base being connected to the positive supply through a resistor 24. The emitter of the transistor 23 is connected to ground while its collector is connected to the positive supply through a resistor 25. Said collector is also connected through diode 26 to the negative input of an integrator 27 the output of which is connected to the negative input of the comparator 17. The two inputs of the comparator 17 are connected to the positive supply through two resistors 28 and 29. In the line 16 and in the output line of the integrator 27 two resistances 30 and 31 have been interposed. Between the negative input and the output of the integrator 27 is a condenser 32. The positive input of the integrator 27 is connected to the positive supply through a variable resistance 33 as well as to the collector of a transistor 34, the emitter of which is connected to ground and the base of which, biassed by a resistor 35, receives the signal P transmitted from the inverter 19.

The integrator 26 has its positive input supplied for the duration of the signal P so that its output voltage increases during the entire duration of signal P. At the termination of the signal P, that is to say at the beginning of the signal P, the transistor 34 which was initially blocked becomes conductive, so that the integrator 27 no longer integrates for the length of the signal P. The outlet voltage attained at the end of the signal P is nevertheless stored in the condenser 32. This produces the first voltage, the signal of which has been represented on line L3 of FIG. 1. The return to zero of this first voltage is effectuated by the monostable multi-vibrator 21 which supplies a positive pulse at the moment of the trailing edge of the signal P, said positive pulse being supplied to the negative input of the integrator 27 and causing the discharge of the condenser 32. The first and second voltages generated by the integrator 27 and the condenser 7 respectively are compared in the comparator 17, the output of which supplies a signal when the second voltage becomes equal to the first. The output of the comparator 17 is supplied through a resistance 36 to the negative input of an integrator 37 operating as an OR gate. The signal P is also supplied to this negative input via the line 4 which contains a resistance 38. The positive input of the integrator 37 is connected to the positive supply through a resistance 39. The integrator 37 supplies a control signal either when the comparator 17 supplies an output signal, or at the moment at which the leading edge of P passes, if there has not been a previous output signal supplied by the comparator 17. One thus obtains a control signal which, in the first hypothesis, corresponds to a point on the curves A1 or A2 and, in the second hypothesis, corresponds to a zero ignition advance.

The output signal of the component 37 is supplied to a monostable designated in its entirety by reference numeral 50 and comprising a transistor 40, the collector and base of which are connected to the positive supply by the resistances 41 and 42 respectively. The base is additionally connected to the output of the component 37 through a condenser 43. The emitter of the transistor 40 is connected to the base of a transistor 44 connected to a third transistor 45 in a Darlington pair. The emitter of transistor 44 is connected to the base of transistor 45. The emitter of transistor 45 is connected to ground. The two collectors of the transistors 44 and 45 are connected to ground through a condenser 46. The base of the transistor 44 is connected to the collector of transistor 45 through two Zener diodes 47 and 48. The output of this circuit appears at the collector of transistor 45 and is supplied at 49 to the primary winding of the ignition coil with which the device according to the invention is associated. When the monostable 50 receives a control signal from the component 37 it supplies an impulse which blocks the Darlington pair constituted by the transistors 44 and 45 and stops consequently the supply to the primary winding of the coil whicn corresponds to initiation of the ignition. It will be seen that the above described device makes it possible, in part, to generate the first and second voltages the signals of which are represented on lines L3 and L4 of FIG. 1 and, on the other hand, to compare them and finally to cause the ignition to fire at the moment at which the second voltage becomes equal to the first or at the end of the signal P. This results in the ignition curves illustrated on FIG. 3, the curve A1 corresponding to one of the positions of switch 15 and the curve A2 according to the other position. The passage from one position to the other takes place, for example, at the moment at which vacuum in the inlet manifold exceeds a predetermined threshold.

As has already been indicated, it is possible to position the rotating sector of the sensor so that, when the second voltage does not become equal to the first voltage, the ignition no longer takes place at the top dead point, but with a predetermined advance or lag.

It will of course be appreciated that the embodiment described has been given purely by way of illustration and example, and may be modified as to detail without thereby departing from the basic principles of the invention.

What is claimed is:

1. In a method of periodically controlling at least one function responsive to the speed of rotation of a shaft, which control must be exercised with angular phase displacement with respect to the instant at which a point turning with the shaft passes a stationary point, said phase displacement being a function of the speed of rotation of the shaft, said method comprising the steps of generating a signal P the duration of q of which corresponds to the period during which a rotating sector having a constant angle $\phi$ passes said stationary point, generating a complementary signal $\overline{P}$ throughout the period $\overline{q}$ corresponding to the absence of the signal q, generating during one of the succeeding periods q and $\overline{q}$ a first voltage of the form $aq+b+ce^{-\gamma q}$ where a and b are constants c=o, and which varies as a function of $\overline{q}$, generating during a succeeding period q a second voltage which is a function of the time 5 from the beginning of said period q in which said signal P is generated, said second voltage being in the form $d+ge^{-\alpha t}$, where d and g are constants and $\alpha$ is a positive constant, said second voltage being independent of shaft speed, and generating a control signal when the second of said voltages becomes equal to the first.

2. Process as claimed in claim 1 in which the first voltage is generated during the period $\overline{q}$ which follows the period q of the signal P and in which this first voltage is stored while the second voltage is being generated during the succeeding period q.

3. Process as claimed in claim 1 in which the second voltage is generated at the terminals of a condenser which is charged through a charging resistance.

4. Process as claimed in claim 1 in which the first voltage is obtained by using an integrator which operates for the period of signal P or $\overline{P}$.

5. Process according to claim 1 in which the first and second voltages are returned to their initial value at the moment at which the trailing edge of the signal P is produced.

6. Process as claimed in claim 1 in which, if the second voltage does not become equal to the first voltage within the interval of time over which they are compared, the control signal is initiated at the moment at which leading edge of the signal $\overline{P}$ occurs.

7. Process as claimed in claim 1 utilizing at least one parameter in addition to the speed of rotation of the shaft, in which the characteristics of the components of the circuits generating the first and/or second voltages are modified as a function of the parameter selected.

8. In a device for controlling the ignition advance of a reciprocating internal combustion motor with respect to the top dead point of the stroke of each piston, said device comprising a stationary detector which cooperates with a rotating sector, associated with the motor shaft, which sector subtends an angle $\phi$, and the speed of rotation of which shaft determines the ignition advance, said detector furnishing during the passage of said sector, a signal P having a duration q, and furnishing a signal $\overline{P}$ in the absence of the signal P, the improvement according to which said device comprises first circuit means for generating a first voltage of the form $aq+b+ce^{-\gamma q}$, in which a and b may be any constant, and c=o; second circuit means for generating a second voltage independent of motor speed and of the form $d+ge^{-\alpha t}$, in which formula d and g may be any constants, $\alpha$ is a positive constant, and t represents the time counted from the beginning of said signal P; and comparator means supplied by said first and second circuit means for generating a control signal when the second voltage becomes equal to the first voltage.

9. Device as claimed in claim 8 in which an OR gate permitting the delivery of a control signal is connected to the output of the comparator means and also receives the signal $\overline{P}$.

10. Device as claimed in claim 8 in which the control signal emitted at the moment at which ignition must occur is supplied to the input of a monostable the output of which controls two transistors associated in a Darlington pair, said pair being connected to cut off the supply to the primary winding of an ignition coil associated with the device at the moment at which the control signal is emitted.

11. Device as claimed in claim 9 in which the circuit means generating the first voltage comprises an integrator operating for the duration of the signal $\overline{P}$, the output voltage of said integrator being stored during the following signal P by a condenser connected between the input and output of the integrator, the voltage being returned to zero by a monostable supplying to the input connected to the condenser a pulse having a sign opposite from that of said input at the moment at which the leading edge of the signal P occurs.

12. Device as claimed in claim 11 in which the integrator which generates the first voltage has another input, and transistor means for connecting said another input to receive a signal during the signal $\overline{P}$ and to ground during the signal P.

13. Device as claimed in claim 8 in which the circuit generating the second voltage consists of a condenser associated with a charging resistance.

14. Device as claimed in claim 13 further comprising means for varying the charging resistance of the circuit for generating the second voltage as a function of the value of a parameter other than the speed of rotation of said shaft.

* * * * *